(12) United States Patent
Batty et al.

(10) Patent No.: US 8,425,664 B2
(45) Date of Patent: Apr. 23, 2013

(54) MUTUAL REMEDIATION OF EFFLUENTS OF PETROLEUM PRODUCTION

(75) Inventors: J. Clair Batty, North Logan, UT (US); David A. Bell, Farmington, UT (US); Craig E. Cox, Fruit Heights, UT (US)

(73) Assignee: Purestream Technology, LLC, Salt Lake City, UT (US)

( * ) Notice: Subject to any disclaimer, the term of this patent is extended or adjusted under 35 U.S.C. 154(b) by 499 days.

(21) Appl. No.: 12/687,746

(22) Filed: Jan. 14, 2010

(65) Prior Publication Data
US 2010/0175983 A1    Jul. 15, 2010

Related U.S. Application Data

(60) Provisional application No. 61/144,665, filed on Jan. 14, 2009, provisional application No. 61/144,694, filed on Jan. 14, 2009.

(51) Int. Cl.
*B01D 47/00*    (2006.01)

(52) U.S. Cl.
USPC ............... 95/219; 95/224; 95/227; 95/228

(58) Field of Classification Search ........... 203/24, 203/32, 40; 165/154, 164, 175; 95/158
See application file for complete search history.

(56) References Cited

U.S. PATENT DOCUMENTS

| | | | | |
|---|---|---|---|---|
| 3,704,570 A | * | 12/1972 | Gardenier | 95/227 |
| 4,149,378 A | * | 4/1979 | Nakamura et al. | 60/293 |
| 4,572,292 A | * | 2/1986 | Stapp | 166/400 |
| 4,957,520 A | * | 9/1990 | Parmentier et al. | 96/136 |
| 5,240,482 A | * | 8/1993 | Sung | 96/235 |
| 7,448,146 B2 | * | 11/2008 | Cho et al. | 34/601 |
| 7,717,174 B2 | * | 5/2010 | Heins | 166/267 |
| 2011/0083556 A1 | * | 4/2011 | Duesel et al. | 95/158 |

* cited by examiner

*Primary Examiner* — Duane Smith
*Assistant Examiner* — Ives Wu
(74) *Attorney, Agent, or Firm* — Pate Baird, PLLC (57) ABSTRACT

Petroleous production is associated with effluents well known to foul lines, nozzles, and containers while consuming substantial energy to assist in both production and remediation. A heat exchanger and manifold system maximizes flows, minimizes changes in flow cross-section, and maximizes heat transfer area, while recycling both water and heat between processes. Dirty regions and clean regions result from scrubbing horizontal exhaust stacks and evaporation of production water in concert to remediate one another, while recycling a significant portion of the energy consumed by each. The heat exchanger relies on a manifold having many layered conduits, each connected to a single layer level of one or more cylindrical conduits in the exchanger. The cylinders of the exchanger themselves are arranged in multiple layers, each layer of a heat exchanger element being connected to a single layer of the manifold. Any shape of cylinder may work, but a right circular cylinder having corrugated sheets spacing the layers may be simple to construct.

20 Claims, 7 Drawing Sheets

MUTUAL REMEDIATION OF EFFLUENTS OF PETROLEUM PRODUCTION

RELATED APPLICATIONS

This application claims the benefit of U.S. Provisional Patent Application Ser. No. 61/144,665 filed Jan. 14, 2009 and U.S. Provisional Patent Application Ser. No. 61/144,694 filed Jan. 14, 2009, and incorporates by reference the entirety of each thereof.

BACKGROUND

1. The Field of the Invention

This invention relates to oil and gas production and, more particularly, to novel systems and methods for environmental protection from, and remediation of, production materials and processes.

2. The Background Art

The production and transportation of petroleum resources, including oil and natural gas, often involves the introduction of emissions of substances considered pollutants into the natural environment. Often the production areas are in locations regarded as being particularly environmentally sensitive. Sources of pollutants include engines, heaters, flares, road surfaces, and production fluids themselves. Production water often contains dissolved solids (e.g., salts) that make it unsuitable for ordinary beneficial (e.g., agricultural, culinary, etc.) use or release directly into the environment. Hauling water to and from the production site usually requires extensive and expensive trucking over roads through environmentally sensitive areas. Similarly, large amounts of waste heat from numerous engines, heaters, burners, flares, or combinations thereof are released into that same sensitive environment. Any company or state with extensive fossil fuel reserves will have much at stake over these issues.

What is needed is a system and method to address the issues of effectively mitigating environmental impacts associated with fossil fuel development and production.

BRIEF SUMMARY OF THE INVENTION

In view of the foregoing, in accordance with the invention as embodied and broadly described herein, a method and apparatus are disclosed in one embodiment of the present invention as including a source of combustion exhaust, a substantially horizontal "stack" acting also as a scrubber, and a recovery system. The recovery system may typically include a blower, a cyclone, a condenser, and various heat exchangers.

Saline production water is often available in the same location as flares, burners, heaters, engines and compressor stations. Basic design concepts have been developed for using production water to effectively scrub the emissions of volatile organic compounds, unburned hydrocarbons, combustion particulates, and sulfurous oxides. From these combustion sources, systems in accordance with the invention simultaneously put the waste heat from these combustion sources to beneficial use to evaporate production brine, thus reducing the volume of saline production water to be disposed of, in an environmentally responsible manner.

In many oil/gas fields, the quantities of waste heat available are not sufficient to process the amount of saline water produced in the same area. In such situations, the same design concepts provide for clean emission-scrubbed combustion of field gas to supplement any waste heat available. An efficient energy recovery system makes evaporation a cost effective way to dispose of the saline water with minimal environmental impact. In addition, the energy recovery system also returns a large fraction of the saline production water as clean distilled water.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DESCRIPTION OF THE PREFERRED EMBODIMENTS

It will be readily understood that the components of the present invention, as generally described and illustrated herein, could be arranged and designed in a wide variety of different configurations. Thus, the following more detailed description of the embodiments of the system and method of the present invention, as represented here and in the Appendix attached hereto, is not intended to limit the scope of the invention, as claimed, but is merely representative of various embodiments of the invention.

Notwithstanding consolidation of multiple wells at a single production site, as well as various waste containment and site restoration, environmental impacts continue from the production of natural gas and oil. Typically, sources of particulate emissions include heaters used to reduced the viscosity of oil. Likewise, various motors or engines designed to run on petroleum byproducts such as "field gas" produce heat and hydrocarbon emissions. Meanwhile, production of small quantities of field gas in oil fields results in gas having to be flared off. Thus, flares and other sources contribute particulate and thermal emissions. The alternative to flaring is to release unburned hydrocarbons into the atmosphere. Even after burning or other remediation methods, unburned volatiles are still often returned into the environment intentionally or accidentally.

Heaters typically burn field gas to warm crude oil to reduce its viscosity for better handling. The high viscosity of crude oil is often responsible for high pumping costs. Pumping costs may be reduced by reducing viscosity of the oil. Some crude oil is so thick that it actually behaves as a thixotropic material. Also, as part of the separation process for separating water from oil, gas, or both heaters may be employed.

Engines used in oil fields and gas occur in two principal functions. Natural gas typically is compressed to increase the mass flow rate to collection points from the distribution networks at individual oil fields Likewise, crude oil must be pumped or otherwise transported from the well head to a collection point. Some wells produce little enough to transport it on trucks. Others produce sufficient volume to justify pumping from the well head to collection points. From collection points, crude oil may still be trucked or otherwise transported.

In any event, pumping requires drive motors. Thus, engines are integral to the transport of crude oil and natural gas. Meanwhile, production of oil requires pumps drawing oil from the earth. Moreover, drilling processes themselves rely on engines. Thus, whether driving a pump, compressor, generator, or drilling rig, engines are a burner of fuels, and a generator of thermal and other emissions.

Flares have been reduced in recent years but remain in several circumstances. Typically, if a field produces substantial quantities of natural gas, commercially significant volumes, then collection is developed and an infrastructure is put in place to do so. In other circumstances insufficient quantities may not justify collection and transport. In these circumstances, unsteady or gas may be flared off. Meanwhile, gas production may not be uniform. In such circumstances, periodic gas generation may require flaring. Thus, some amount of flaring of field gas is substantially unavoidable. However, the vision of a tall stack with a large, orange, sooty flame flaring at the top thereof creates public relations issues as well as legitimate environmental concerns.

Meanwhile, unburned volatiles existing in the process of producing natural gas and crude oil arise in several circumstances. For example, unburned volatiles may be part of the production water separated from oil and gas products. Meanwhile, various combustion processes (e.g., engines, heaters, etc.) may still pass unburned volatiles through. Unburned hydrocarbons, whether heavy or volatile, can result from heavy molecular chains that are not completely or efficiently broken down and combusted. Likewise, unburned volatiles may simply result from processes and equipment that burn at temperatures and in flow patterns that do not complete combustion of all volatiles. Meanwhile, volatiles can arise from other sources as well.

The result is tank batteries, sumps, holding ponds, possible exposure to leaks or breaks in containment structures, and the like. All of these may give rise to the need to handle unburned volatiles.

In summary, oil, gas, saline water, (production water), and the like are the typical fluids from oil and gas production. Since evaporation ponds, injection wells, and hauling are all subject to their own difficulties, an apparatus and method in accordance with the invention may augment the disposal of production water. Since containment, hauling, reinjection, evaporation, and the like all have risks and limits, an apparatus and method in accordance with the invention deals with production water at a wide variety of salinity values, net volumes, and so forth.

In various embodiments of apparatus and methods in accordance with the invention, production water is used to scrub oil and gas emissions in the field. Meanwhile, waste heat from combustion sources is used in evaporating production water. The production water vapor from evaporation may be dispersed into the atmosphere, or may be re-condensed as distilled water for use in systems that would otherwise not tolerate the water as a saline solution.

Figure 1:
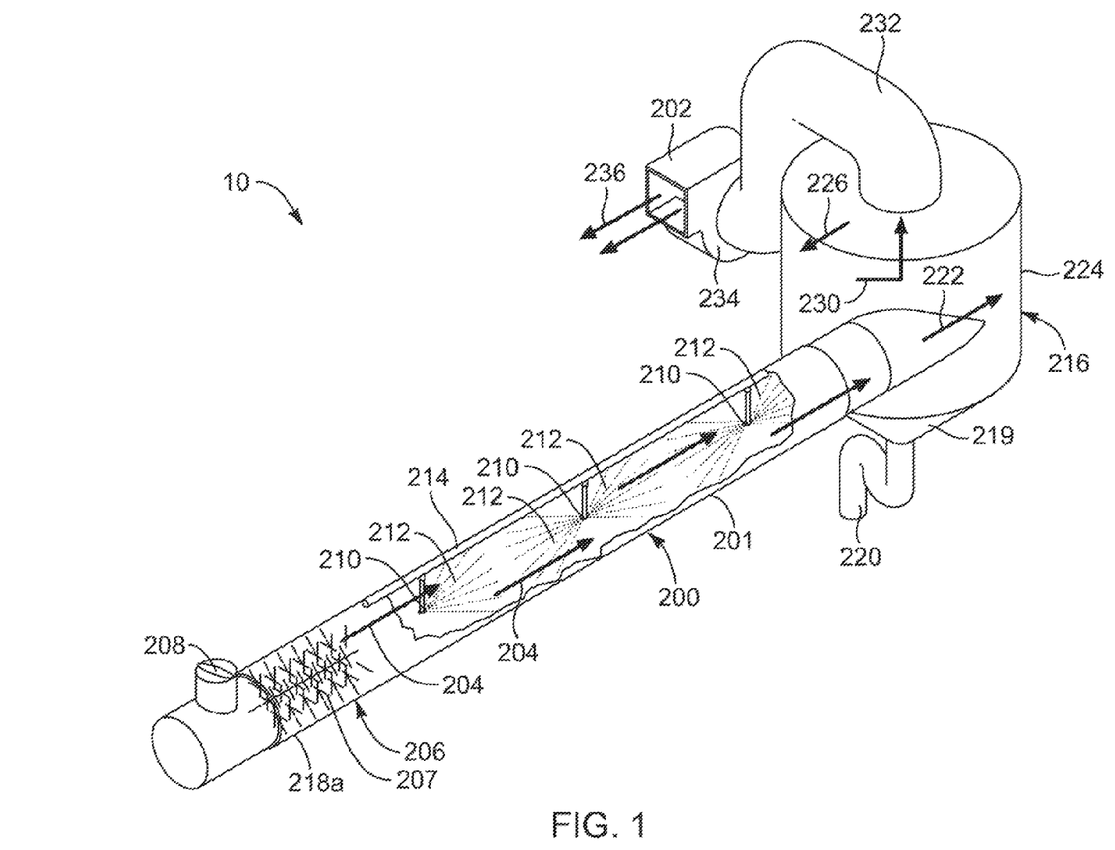
FIG. 1 is a schematic perspective view of one embodiment of an apparatus in accordance with the invention.
Figure 2:
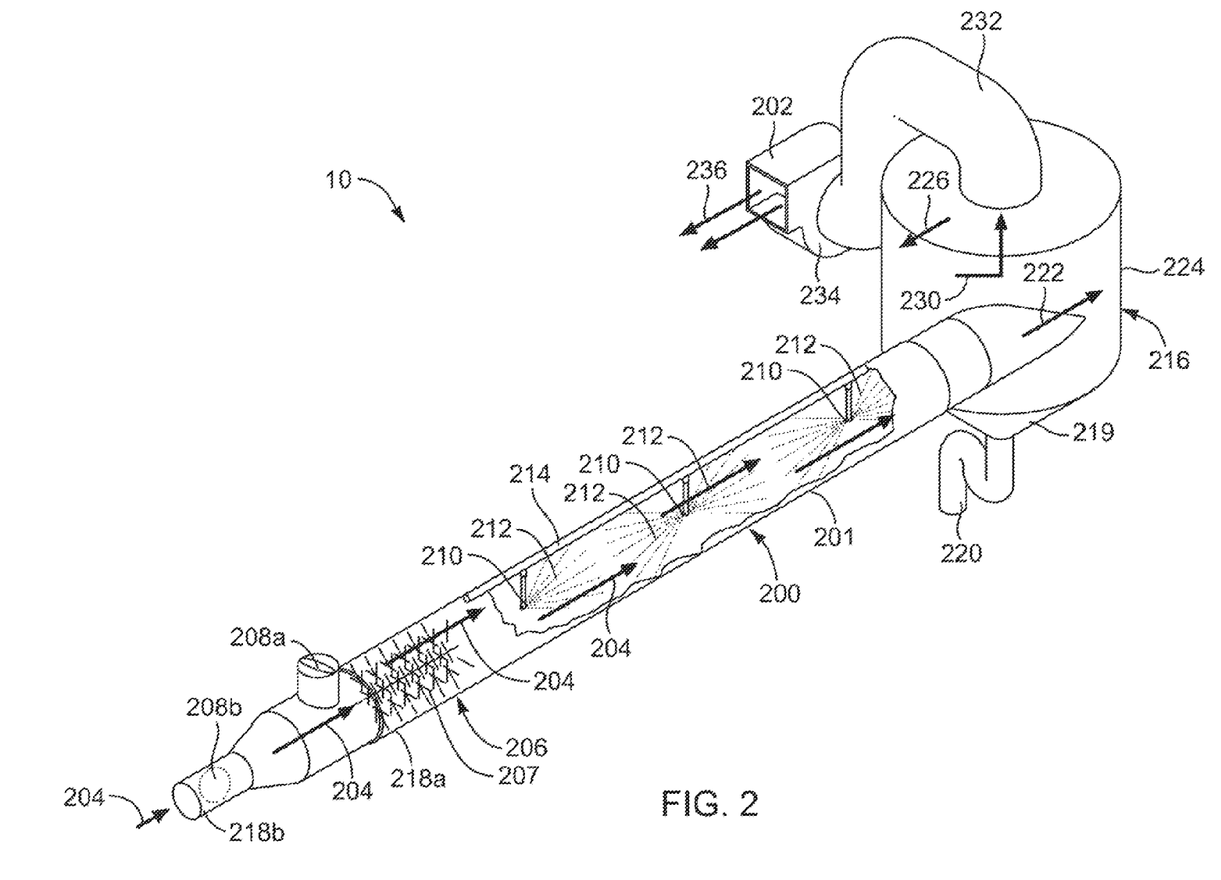
FIG. 2 is a schematic perspective view of an alternative embodiment of an apparatus in accordance with the invention.

Referring to FIGS. 1 and 2, in one embodiment of an apparatus 10 or system 10 in accordance with the invention, a horizontal remediator 200 may act as an evaporator 200, as a scrubber 200, or both. The scubber-evaporator 200 relies on a blower 202 to draw a flow 204 of combustion emissions. Combustion emissions may exist, for example, as an exhaust stream 204 from a flare, a heater, an engine, or the like. A gas burner 206 device or region may hold a flame 207 burning field gas as a heat source or may augment combustion of unburned hydrocarbons (e.g., volatile organic compounds or VOCs) in the exhaust stream 204, or may serve to do both.

Meanwhile, an upstream damper 208 on the flow 204 may be used to regulate the back pressure on the engine, burner, or other source feeding an exhaust stream into the system. A system of nozzles 210 optimized to effect evaporation of water injects an atomized spray 212 of production water (brine, typically) from a feed line 214 into the exhaust stream 204. The system 10 typically contains salts, and recovers them from the exhaust stream 204 in a cyclone 216. A blower 202 maintains a draw on the cyclone 216. Feeding the exhaust stream 204 from a scrubbing "stack" 200, oriented as a horizontal tube 201 intersecting at the edge of the cyclone 216, promotes the separation of solids, liquids, or both from the vapor and gases, by the cyclone 216.

In certain embodiments, a burner 206 may be installed as an integral part of the evaporation module 200 in accordance with the invention. In such an embodiment, the burner 206 may be installed in a separate or integrated conduit 218 fed by air flow regulated through a damper 208. The flow 204 of combustion products is then transported through the conduit 218 to be directly intercepted by atomized sprays 212 of production water. Thereafter, the exhaust products, scrubbed by the liquids, together with the evaporated liquids (now vapors) and precipitated or in trained solids, may be sent into the cyclone 216 for separation.

Ultimately, the blower 202 draws the noncondensible gases and the vapors out, exhausting them to the atmosphere or a condenser. Salt as solids, heavy hydrocarbons, other particles scrubbed out, as well as liquids may remain behind, exiting the bottom 219 of the cyclone 216, such as through a drain 220, after being separated out by the cyclone 216.

In the cyclone 216, the flow 204 containing multiple phases such as noncondesible gases, vapors, liquids, and solids, is received as an incoming flow 222. The incoming flow 222 tends to strike the wall 224 of the cyclone 216, directing the flow 222 in a circumferential direction centripetal force moves heavier (denser) materials outward 226, where they may strike the wall 224 and fall downward toward the bottom 219. Lighter (less dense) materials, more easily accelerated by fluid drag of surrounding vapors and gases, move inward 228. These less dense, more easily entrained, materials eventually follow a path 230 upward toward an outlet line 232 or conduit 232 evacuating the cyclone 216.

The outlet line 232 feeds into an inlet 234 or inlet portion 234 receiving the noncondensible gases (oxygen, nitrogen, etc.), vapors (water, etc.) from the flow 204. Thus, the discharge 236 from the blower 202 may pass into the atmosphere or into a device, such as a condenser, for further processing.

Not only does the damper 208 provide the opportunity to control back pressure on a heat source such as an engine, heater, flare, or the like, the injection nozzles 210 may be designed to provide repeatedly a cone of spray that will completely cover the cross section of the "stack" 200 formed by the conduit 218. (The reference numeral 218 refers to conduits generally, and when used with a trailing letter indicates a specific instance thereof.) Thus, by spraying axially along a conduit (forward, backward, or both with respect to the exhaust flow) the flow 204 may pass through several conical curtains of spray 214 that effectively present a barrier across the entire cross section of the conduit 201 of the evaporator 200 or scrubber 200. Spray 212 direction, velocity, particle size, chemical content, or the like may be optimized for scrubbing, evaporating, or both.

In some circumstances, the balance between scrubbing and evaporating may be accomplished by adjusting the length of the scrubber 200 to provide the needed quantity of evaporation as well as scrubbing required. Again, the damper 208 may also be used to optimized flows, balancing back pressure on the burner 206 (or engine, flare, heater, etc.) while also regulating the mixture of dry ambient air mixed into the exhaust flow 204.

A secondary flame 207 or burner 206 for reacting or oxidizing unburned hydrocarbons or volatile organic compounds remaining in an exhaust stream 204 may be operated or installed according to need. If comparatively clean field gas, predominantly natural gas (e.g., methane), is available, the presence of volatile organic compounds may be manageable. By contrast, a diesel engine operating on a well site may release more particulate emissions and unburned volatile or non-volatile organic compounds. Likewise, burning field gas having a higher fraction of larger molecules than does methane, and perhaps some very large petroleum molecules entrained, may tend toward higher levels of volatile organic compounds in the exhaust.

Figure 3:
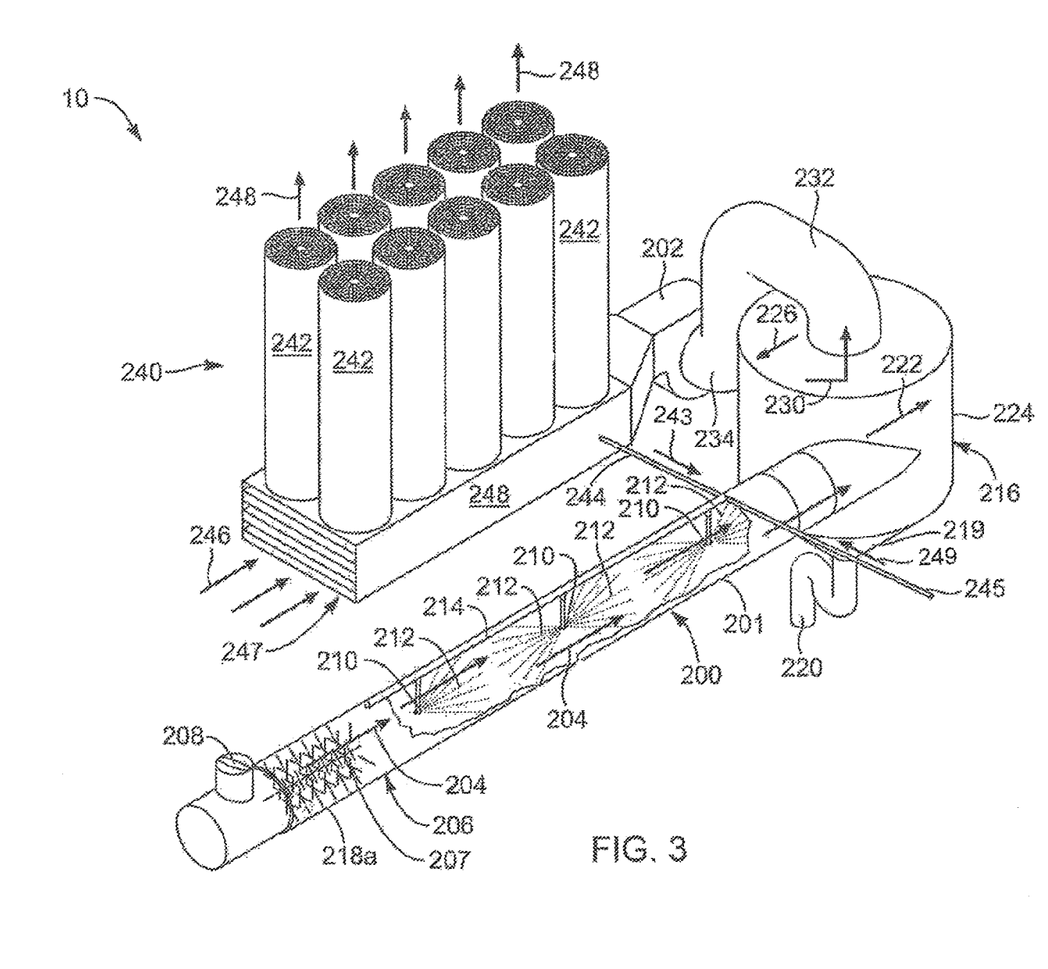
FIG. 3 is a schematic perspective view of the embodiment of FIG. 1 augmented with a bank of heat exchangers.

Referring to FIG. 3, while continuing to refer generally to FIGS. 1-8, in one embodiment, a remediator device 200 acting as a scrubber 200, evaporator 200, or combination 200, may also be combined with a recovery module 240. The recovery module 240 may include one or more condensers 242 to recover water vapor as, effectively, distilled water. A discharge line 244 may send a flow 243 of the recycled condensate to feed the line 214 into the nozzles 210. In certain embodiments, the condensers 242 may be oriented vertically, so air flows promote a natural chimney-effect buoyancy. For example, air flows 243, drawn in and used to cool the water vapor and exhaust gases received from the blower 202, will receive heat therefrom, tending to cause and upwardly rising flow 248 of scrubbed exhaust gases, water vapor, and ambient air as a result of the decreased density thereof out of the system 10.

In certain embodiments, the blower 202 drawing on the cyclone 216 and the scrubber 200 or evaporator "stack"200 may be configured to raise the pressure in the condensers 242. Thus, the resulting, reduced, upstream pressure may promote evaporation in the scrubber 200 or evaporator 200, as well as in the cyclone 216. The increased pressure in the subsequent or downstream condenser system 242 beyond the blower promotes increased condensation.

The flow 243 in the line 244 fed from the condensers 242 is distilled water. Optionally, a makeup flow 249 of water may be required. The makeup flow 249 may pass through the line 245 into the feed line 214 to supply the nozzles 210. The extent to which the flow 246 from the condenser 242 is insufficient to completely supply the scrubber 200 is driven by the net evaporation of water in the discharge flow 248, as well as the drained brine exiting the cyclone 216 through the bottom drain 220. The condensers 242 may be configured modularly in order to best match the flows 222, 236, 243 throughout the system 10.

In general, flows 246 of ambient air may pass through the inlet 247 into a manifold 248 feeding the condensers 242. Meanwhile, in a concurrent flow arrangement, passages feeding an exhaust flow 236 from the blower 202 run vertically, adjacent to passages feeding the ambient air flow 246 upward through the condensers 242. Adjacency may be horizontal in a rectangular, circular, or other configuration. The illustrated embodiment relies on radially concentric, adjacent passages. Thus, cooled exhaust and warmed ambient air form the mixed flows 248 exiting the condensers 242.

Referring to FIG. 4, and FIGS. 1-8 generally, in other alternative embodiments, a heat recovery section 250 or module 250 may be added. The recovery module 250 may be connected by providing manifolds 252, 254 on the inlet and outlet ends 256, 258, respectively, of one or more condensers 242 acting as heat exchangers 242. For example, a counterflow (or even a cross-flow) heat exchanger 242 may provide ambient air coming into an inlet 260, passing through the heat exchangers 242, and continuing onward toward an outlet 262.

Figure 4:
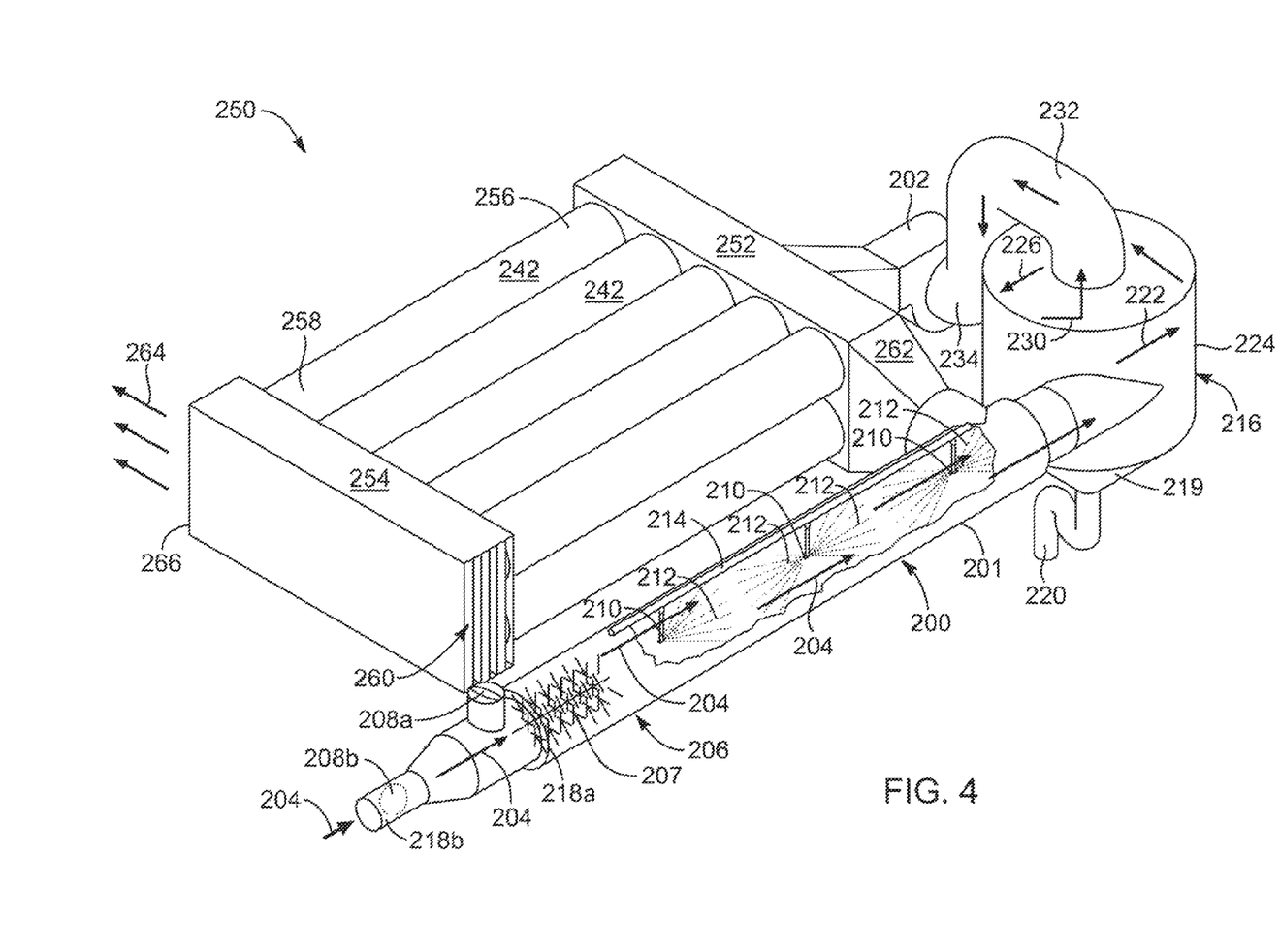
FIG. 4 is a schematic perspective view of an alternative embodiment of an apparatus in accordance with the invention, augmented with heat and moisture recycling heat exchangers.
Figure 5:
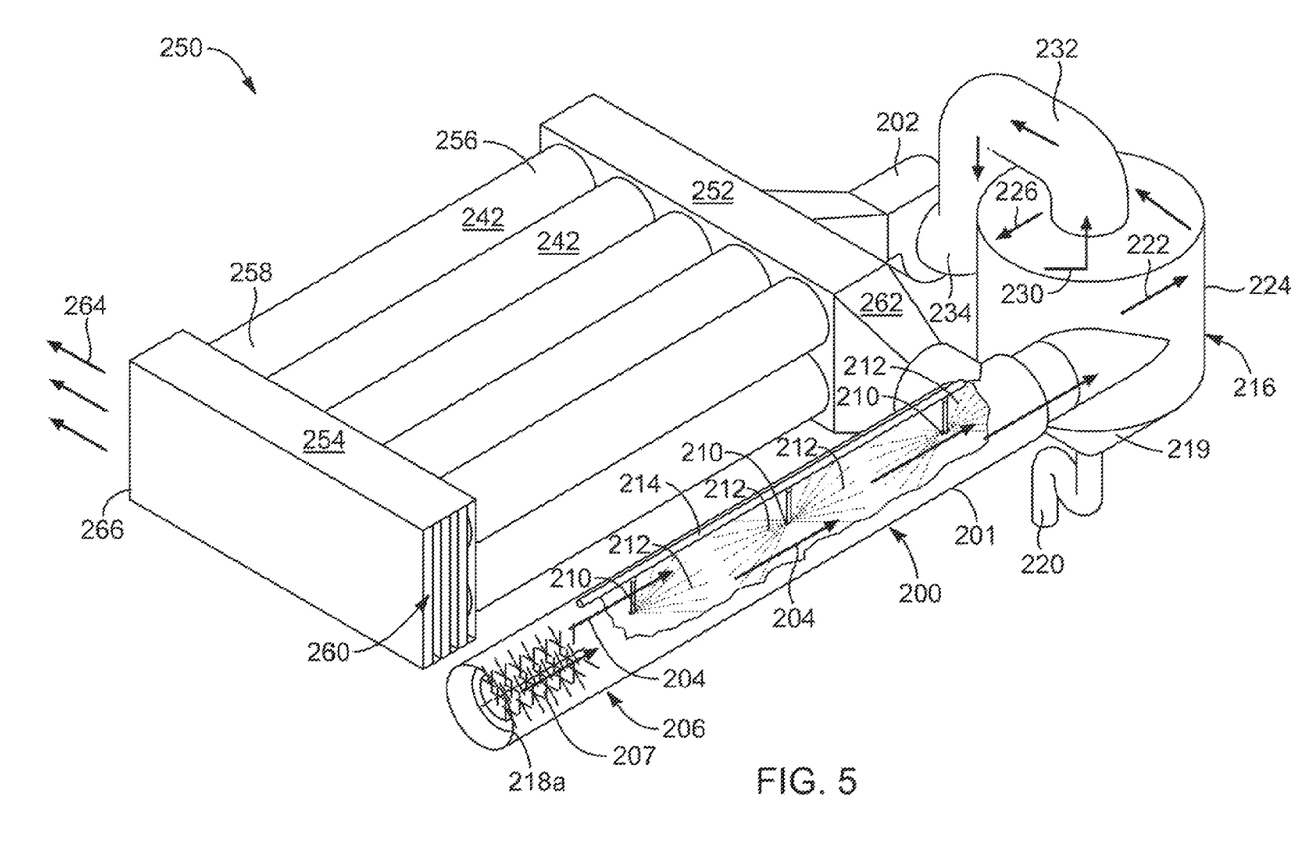
FIG. 5 is a schematic perspective view of the embodiment of FIG. 4 with double walled scrubber recycling heat and moisture from the heat exchangers.

As seen in FIGS. 4 and 5, in certain embodiments, the outlet 262 may feed into a double-walled conduit 218. For example, the scrubber 200 may have a double wall as illustrated in order to feed the output flow from the outlet 262 into an outer shell or annulus of the conduit 218. The outer annulus of the conduit 218, in turn, empties into the axially central portion of the conduit upstream of and feeding into the flame 207 of the burner 206 thereat. Thus, preheating uses heat and mass flows recaptured by the heat exchangers 242 and recycled into the exhaust flow 24 near the inlet to the scrubber 200.

This ambient air flow 246 passes through one set of channels (e.g., the channels formed by the supporting, corrugated dividers in one annulus of the several concentric annuli) in the heat exchanger 242. The corresponding heat transfer flow or opposing flow may travel in an opposite direction through radially adjacent annuli flanking the first. This corresponding or opposite flow, when implemented in a rectangular system, may run either parallel to or orthogonal to the channels or overall passages carrying scrubbed exhaust 236 exiting the blower 202. Leaving the heat exchanger, the discharge 236 becomes an exiting flow 264 issuing from the exhaust outlet 266.

Air and water may be preheated by a condenser 242 acting as a heat exchanger 242 recovering the sensible heat of gases, as well as the potentially substantial latent heat of vaporization out of the distilled water output from the condenser 242. The outlet 262 passing pre-warmed ambient air into the evaporator 200 may connect to the conduit 201 of the evaporator 200 further upstream along the exhaust flow 204. In either configuration, significant energy inputs and water (distilled)) may be recovered into the exhaust flow 204. Thus, a certain portion of the heat may be continually added into the exhaust flow 204, and yet be re-extracted prior to final exit of the exhaust flow 264 out of the system 10.

Referring to FIG. 5, while continuing to refer generally to FIGS. 1-8, in other embodiments, waste heat from another device, such as a heater, engine, flare, or the like, outside the system 10, may not be available. For example, remediation of production water may require burning field gas directly to evaporate water. Thus, in certain embodiments an apparatus 10 in accordance with the invention may burn field gas in a burner 206 creating the hot exhaust flow 204 for the specific purpose of evaporating water to be run through a evaporator 200 and cyclone 216. Ultimately, the system 10 may condense a portion of the water back to distilled water.

By providing heat exchange as in the embodiment of FIG. 4, the system 10 may preheat air and water. Heat may be recovered from both the sensible heat recovered from the discharged flow 264 and the latent heat recovered from the condensed distilled water. Pressure increased in the condenser due to pressure from the blower 202 enhances condensation. The pressure drop in the evaporator 200, due to the draw by the blower 202 demand for input enhances evaporation, as described hereinabove.

Figure 6:
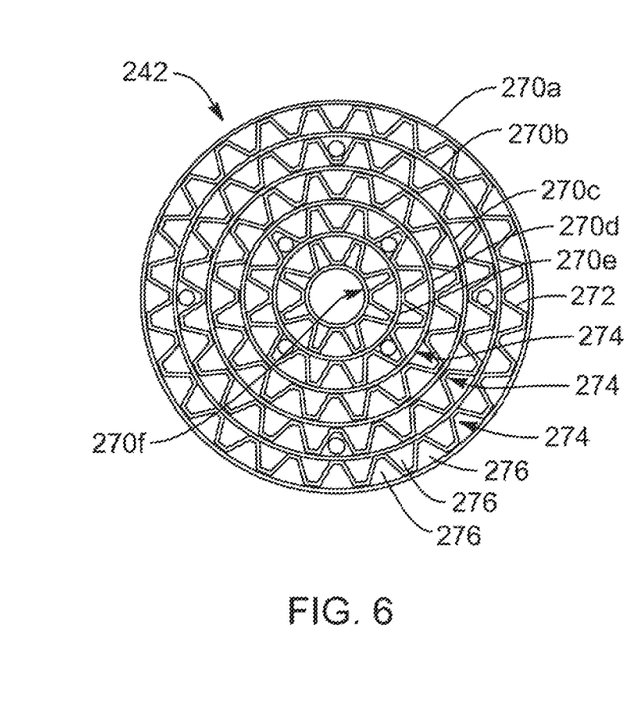
FIG. 6 is an end cross-sectional view of one embodiment of passages of a heat exchanger in accordance with the invention.
Figure 7:
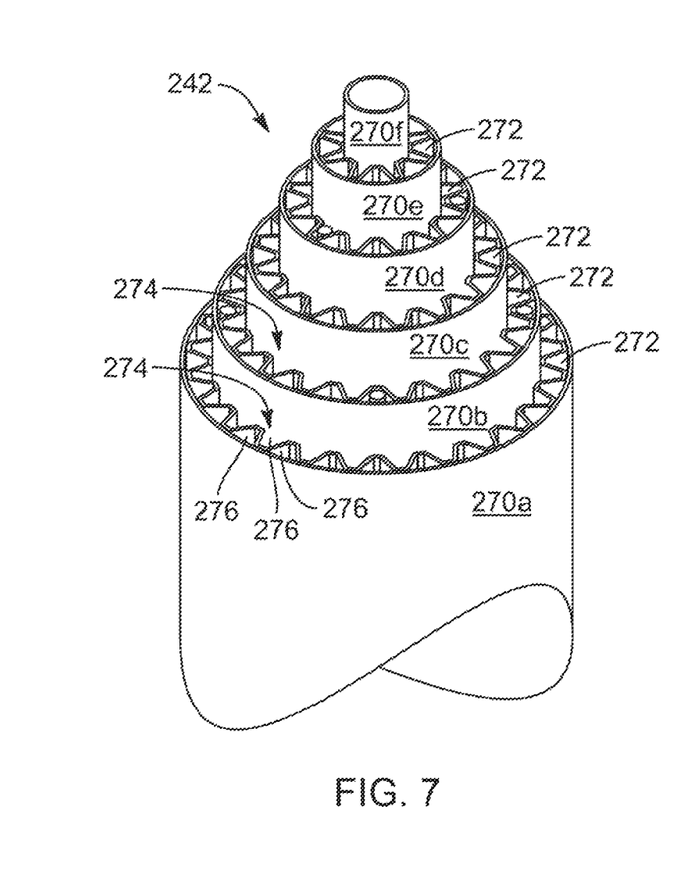
FIG. 7 is a top quarter perspective view of the heat exchanger of FIG. 6.

Referring to FIGS. 6-7 while continuing to refer generally to certain to FIGS. 1-8, in certain embodiments, a condenser 242 may provide a flow of heat, exchanged through concentric cylinders 270 spaced apart. The spacers 272 themselves may take the form of corrugated metal sheets or the like. Thus, the spacers 272 may act as fins while supporting each annulus 274 between adjacent cylinders 240, forming channels 276 between the fins.

Adjacent annuli 274 carry flows in opposite directions for counter-flow heat exchange. Accordingly, excellent thermal contact between the exhaust 236, with its condensing vapors, and the cooling air receiving heat therefrom may be achieved. A structurally robust configuration results from essentially very thin materials, such as sheet metal, for example.

Figure 8:
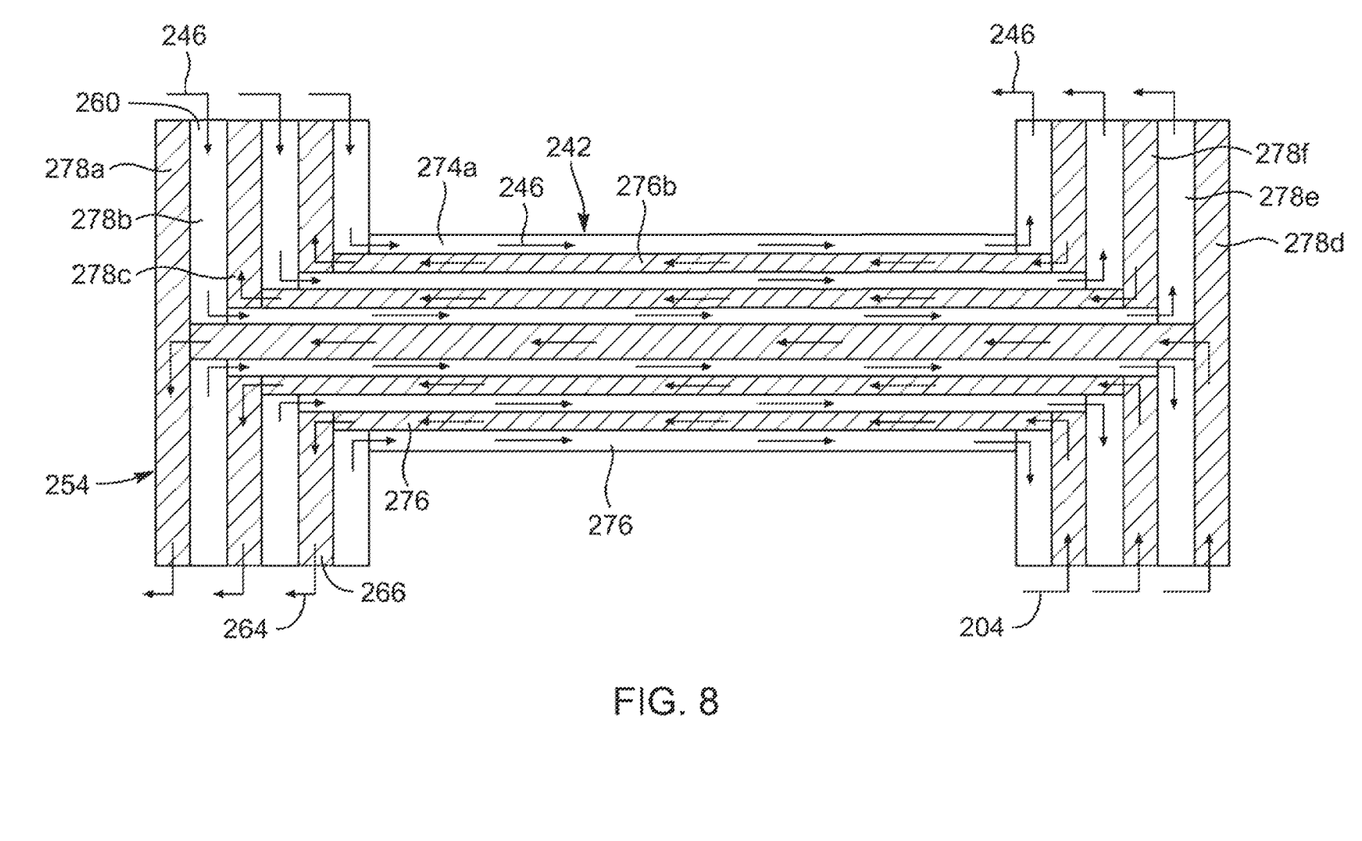
FIG. 8 is a side elevation view of the heat exchanger of FIGS. 6 and 7 assembled with end manifolds.

Referring to FIG. 8, while continuing to refer generally to FIGS. 1-7, such a heat exchanger 242, using concentric tubular structures 270, may be interfaced with a manifold 272, 274. Manifolds may be mechanically attached in fluid communication with the condensers 242 at either end. Passages in the manifolds 272, 274 each provide access to only periodically occurring (e.g., typically alternating) annular spaces 274.

For example, an ambient air flow 246 may enter an inlet 260 of the manifold 254. Passing through the channels 276*a*, the air is heated by exhaust flows 204 in adjacent annuli 274*a*, 274*b*, radially adjacent channels 276. Adjacency between annuli 274 each with its own set of channels 276 distributed circumferentially therearound, contributes to comparatively high rates of heat transfer therebetween, due to thin annular walls and the fin effect of the spacers 272.

By the time the exhaust flow 264 exits the outlet 266, it has released most of its heat into the ambient air flow 246. The exact heat exchange and temperature changes depend upon the specific values of parameters such as thicknesses, hydraulic diameters, lengths, fluid properties, velocities, and so forth controlling heat transfer.

Moreover, a significant amount of latent heat from any water vapor condensed therein has also been so transferred. The manifolds 252, 254 support distribution and collection of flows into distinct annuli 274 by having each inlet or outlet end of annulus 274 connect to a particular layer 278 of the respective manifold 252, 254.

Thus, various apparatus and methods in accordance with the invention may significantly reduce the environmental impact of saline water as well as that of chemical, thermal, particulate, and other exhaust emissions. To the extent that these processes can be balanced, a highly symbiotic relationship may exist between remediation of production water, remediation of organic compositions including VOCs, remediation of rejected heat, and remediation of combustion products.

Meanwhile, the tall stack, so familiar, with the flare of a production facility or refinery, may be laid down as a horizontal tube, less expensive to manufacture, easier to maintain, and easier to support. Meanwhile, stacks may have immediate and affirmative back pressure control by attachment of dampers. Meanwhile, scrubbing reduces emissions of volatile organic compounds, oxides of sulfur, particulates, and heat, while recovering heat, distilled water, or both to be recycled from saline production.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for remediating outputs from a well providing petroleum production, the method comprising:
    providing an energy source providing combustion of a hydrocarbon composition from the well;
    discharging an exhaust from the energy source as a first stream;
    controlling dynamically a back pressure on the exhaust;
    providing a scrubber spraying a liquid thereinto derived from production brine from the well;
    conducting the exhaust through the scrubber removing particulates, unburned hydrocarbons, and heat from the exhaust into the liquid;
    evaporating into the first stream at least a portion of the liquid;
    separating substantially the particulates and unburned hydrocarbons from the first stream into the liquid; and
    condensing to liquid a portion of the first stream by exchanging heat from the first stream into a second stream comprising ambient air; and
    releasing at least a portion of the second stream, after heating thereof by the first stream, into the combustion.

2. The method of claim 1, wherein the energy source comprises a machine combusting a hydrocarbon fuel.

3. The method of claim 2, wherein the machine is selected from an engine, a flare, and a heater.

4. The method of claim 3, wherein controlling back pressure further comprises operating a damper controlling flow through the scrubber.

5. The method of claim 4, wherein the liquid comprises water.

6. The method of claim 5, further comprising increasing the evaporating by reducing pressure in the scrubber.

7. The method of claim 6, further comprising condensing substantially distilled water from the steam.

8. The method of claim 7, further comprising increasing the condensing by increasing pressure in the steam.

9. The method of claim 8, further comprising transferring heat from the liquid exiting the scrubber into the liquid entering the scrubber.

10. The method of claim 9, further comprising providing the liquid and the hydrocarbon fuel from a well discharging a petroleous composition, wherein the liquid is brine production from the well, and the hydrocarbon fuel is a at least one constituent of the petroleous composition.

11. The method of claim 1, wherein the energy source comprises a machine selected from an engine, a flare, and a heater.

12. The method of claim 1, wherein controlling back pressure further comprises operating a damper controlling flow of the exhaust.

13. The method of claim 1, wherein the liquid comprises water.

14. The method of claim 1, further comprising increasing the evaporating by reducing pressure in the scrubber.

15. The method of claim 1, further comprising condensing substantially distilled water from the steam.

16. The method of claim 1, further comprising increasing the condensing by increasing pressure in the steam.

17. The method of claim 1, further comprising providing the liquid and the hydrocarbon fuel from a well discharging a petroleous composition, wherein the liquid is brine production from the well, and the hydrocarbon fuel is a at least one constituent of the petroleous composition.

18. A method for remediating outputs from a well discharging a petroleous composition, the method comprising:

providing an energy source causing combustion of a hydrocarbon composition from the well and discharging an exhaust as a first stream;

controlling dynamically a back pressure on the exhaust;

providing a scrubber spraying a liquid comprising brine production from the well;

removing, by the scrubber, particulates, unburned hydrocarbons, and heat from the exhaust into the liquid;

separating substantially the particulates and unburned hydrocarbons from the liquid;

evaporating water vapor into the first stream during scrubbing thereof;

condensing at least a portion of the water vapor from the first stream by operating a heat exchanger to extract heat from the first stream and transfer the heat into a second stream comprising ambient air; and releasing at least a portion of the second stream, after heating thereof by the first stream, into the combustion as preheated combustion air.

19. An apparatus comprising:

a heat exchanger comprising a plurality of cylinders disposed concentrically about a central axis defining an axial direction, each cylinder of the plurality of cylinders extending axially a length distinct from that of substantially all the other cylinders of the plurality of cylinders;

the heat exchanger, further provided with at least one exchanger conduit of annular cross section bounded by adjacent cylinders of the plurality of cylinders;

the heat exchanger, further comprising at least one corrugated sheet disposed between the adjacent cylinders, structurally spacing apart the adjacent cylinders and acting as fins conducting heat with respect to the at least one exchanger conduit and the adjacent cylinders;

a manifold comprising at least one manifold conduit formed between adjacent plates of a plurality of plates;

the manifold, wherein the at least one manifold conduit is connected to conduct a first fluid radially therethrough in connection with flowing axially through the at least one exchanger conduit; and a second exchanger conduit in thermal communication with the at least one manifold conduit, the second exchanger conduit conducting a second fluid exchanging heat with the first fluid through an intervening cylinder of the adjacent cylinders.

20. The apparatus of claim 19, further comprising:

the heat exchanger further comprising a plurality of heat exchanger conduits;

the manifold, further comprising a plurality of manifold conduits, each connected to an exchanger conduit corresponding thereto;

each manifold conduit of the plurality of manifold conduits and each corresponding exchanger conduit of the plurality of exchanger conduits providing a flow area of the each manifold conduit not less than the flow area of the corresponding each exchanger conduit at the location of fluid connection therebetween;

substantially each plate of the plurality of plates being provided with a penetration therethrough; and each cylinder of the plurality of cylinders connecting at an end thereof to an edge of the penetration in a single plate of the plurality of plates, distinct and corresponding exclusively thereto.

\* \* \* \* \*